United States Patent
Bode-Mosig et al.

(10) Patent No.: US 12,194,568 B2
(45) Date of Patent: Jan. 14, 2025

(54) METHOD, DEVICE AND COMPUTER PROGRAM FOR PRODUCING A WEAKENING LINE IN A SURFACE OF A COMPONENT

(71) Applicant: JENOPTIK Automatisierungstechnik GmbH, Jena (DE)

(72) Inventors: Andreas Bode-Mosig, Jena (DE); Frank Seidel, Thalbuergel (DE)

(73) Assignee: Jenoptik Automatisierungstechnik GmbH, Jena (DE)

( * ) Notice: Subject to any disclaimer, the term of this patent is extended or adjusted under 35 U.S.C. 154(b) by 0 days.

(21) Appl. No.: 18/038,335

(22) PCT Filed: Nov. 22, 2021

(86) PCT No.: PCT/EP2021/082409
§ 371 (c)(1),
(2) Date: May 23, 2023

(87) PCT Pub. No.: WO2022/112144
PCT Pub. Date: Jun. 2, 2022

(65) Prior Publication Data
US 2023/0347449 A1 Nov. 2, 2023

(30) Foreign Application Priority Data
Nov. 24, 2020 (DE) ...................... 10 2020 131 069.2

(51) Int. Cl.
*B23K 26/364* (2014.01)
*B23K 26/03* (2006.01)
(Continued)

(52) U.S. Cl.
CPC ............ *B23K 26/364* (2015.10); *B23K 26/03* (2013.01); *B23K 26/082* (2015.10); *B23K 26/359* (2015.10); *B23K 2101/006* (2018.08)

(58) Field of Classification Search
CPC .... B23K 26/36; B23K 26/362; B23K 26/364; B23K 26/359; B23K 26/03; B23K 26/08; B23K 26/082
(Continued)

(56) References Cited

U.S. PATENT DOCUMENTS 5,882,572 A 3/1999 Lutze et al.
2006/0290110 A1 12/2006 Diemer et al.
(Continued)

FOREIGN PATENT DOCUMENTS

| DE | 10 2005 026 906 A1 | 12/2006 |
|---|---|---|
| DE | 10 2013 104 138 B3 | 3/2014 |
| DE | 10 2016 123 077 A1 | 5/2018 |

OTHER PUBLICATIONS

International Search Report for International Application No. PCT/EP2021/082409 dated May 9, 2022 with English Translation.
(Continued)

*Primary Examiner* — Nathaniel E Wiehe
*Assistant Examiner* — Alba T Rosario-Aponte
(74) *Attorney, Agent, or Firm* — Muncy, Geissler, Olds & Lowe, P.C.

(57) ABSTRACT

A method for producing a weakening line in a surface of a component. The method comprises a guiding step and a skipping step. In the guiding step, a removal apparatus for removing a material of the surface is guided over a plurality of segments of a predefined line-shaped contour by means of an activated laser beam in order to produce a desired wall thickness for at least one of the segments so as to produce the weakening line. In the skipping step, the segment is skipped if the segment has the desired wall thickness.

18 Claims, 5 Drawing Sheets

(51) Int. Cl.
*B23K 26/082* (2014.01)
*B23K 26/359* (2014.01)
*B23K 101/00* (2006.01)

(58) Field of Classification Search
USPC .......................... 219/121.69, 121.6, 121.68
See application file for complete search history.

(56) References Cited

U.S. PATENT DOCUMENTS

| | | | |
|---|---|---|---|
| 2014/0116531 A1* | 5/2014 | Walker ................ | B23K 26/359 |
| | | | 137/15.18 |
| 2015/0352670 A1* | 12/2015 | Lutze ................. | B23K 26/402 |
| | | | 264/400 |
| 2016/0067821 A1* | 3/2016 | Lutze ................. | B23K 26/082 |
| | | | 219/121.73 |
| 2018/0133841 A1 | 5/2018 | Lutze et al. | |
| 2019/0111522 A1* | 4/2019 | Mauersberger .... | B23K 26/0622 |
| 2019/0321919 A1 | 10/2019 | Cappel et al. | |

OTHER PUBLICATIONS

German Search Report for German Application No. 10 2020 131 069.2 dated Nov. 8, 2021 with English Translation.

* cited by examiner

METHOD, DEVICE AND COMPUTER PROGRAM FOR PRODUCING A WEAKENING LINE IN A SURFACE OF A COMPONENT

This nonprovisional application is a National Stage of International Application No PCT/EP2021/082409, which was filed on Nov. 22, 2021, and which claims priority to German Patent Application No 10 2020 131 069.2, which was filed in Germany on Nov. 24, 2020, and which are both herein incorporated by reference.

BACKGROUND OF THE INVENTION

Field of the Invention

The present approach relates to a method and a device for producing a weakening line in a surface of a component, and to a corresponding computer program product.

Description of the Background Art

DE 10 2013 104 138 B3 describes a method for introducing a weakening line by material removal on a fibrous coating material.

SUMMARY OF THE INVENTION

Against this background, the present approach presents a method for producing a weakening line in a surface of a component and a device for producing a weakening line in a surface of a component as claimed in the main claims. Advantageous embodiments are evident from the respective dependent claims and the following description.

The advantages achievable with the presented approach consist in being able to produce a weakening line in a surface of a component particularly rapidly.

A method for producing a weakening line in a surface of a component comprises a step of guiding and a step of skipping. In the step of guiding, a removal apparatus for removing a material of the surface is guided over a plurality of portions of a predefined line-shaped contour using an activated laser beam in order to produce a target wall thickness for at least one of the portions, in order to produce the weakening line. In the step of skipping, the portion is skipped if the portion has the target wall thickness.

The component can be a covering element for an airbag of a vehicle, which element can be provided with target breaking locations in the region of airbag flaps using the method presented here. The surface can comprise one or more plastics such as polypropylene (PP), thermoplastic polyolefin (TPO), polyurethane (PU) and/or polyvinyl chloride. The surface is provided for being arranged, in the state in which the component has been installed in the vehicle, on a side of the component that faces away from the vehicle occupant, i.e. in a manner invisible to vehicle occupants. The removal apparatus can be a laser that carries out the removal of the material by means of the laser beam by way of material heating. In order to carry out a movement, the removal apparatus can furthermore comprise a scanner, for example a galvanometer scanner. The plurality of portions of the predefined line-shaped contour can be shaped arbitrarily differently or uniformly; by way of example, at least one portion can be shaped as a straight or curved line. The portions can be arranged in a manner merging directly into one another at least in part in order to produce a continuous weakening line, or can be arranged in a manner separated from one another at least in part in order to produce a weakening line that is interrupted/perforated with arbitrary distances among the portions. In this case, the distances can be the same or can differ from one another. Each of the portions can have a target wall thickness, and these can each be the same or can differ from one another. The method presented here makes it possible to skip finished portions that have attained their desired target wall thickness, in order to shorten the processing process for producing the weakening line. In the step of skipping, the portion can be omitted, that is to say that the removal apparatus is not guided over the portion. In the step of skipping, the removal apparatus, with omission of the portion, can be guided to a downstream portion that follows the portion. In the step of skipping, the contour is accordingly actively changed, in particular shortened.

In the step of skipping, an output of the laser beam can be deactivated. It is thus possible to ensure that no material that serves for bridging a distance to a downstream portion is removed during skipping.

It is furthermore advantageous if the method furthermore comprises a step of generating, in which a lead-in section is generated for a downstream portion of the contour that follows the portion, wherein in the step of skipping, the removal apparatus jumps to the lead-in section in order to move over the lead-in section, and/or in which a lead-out section is generated for an upstream portion of the contour that is arranged upstream of the portion, wherein the removal apparatus is moved over the lead-out section before the step of skipping. The lead-in section can be generated as a section between the portion and the downstream portion. In the step of skipping, the removal apparatus can jump to a start of the lead-in section facing the portion, in order then to move over the lead-in section to an end of the lead-in section facing the downstream portion. Correspondingly, in the step of generating, the lead-out section can be generated between the upstream portion and the portion, and/or wherein before the step of skipping, the removal apparatus is moved over a start of the lead-out section facing the upstream portion as far as an end of the lead-out section facing the portion. An output of the laser beam can be deactivated during the movement of the removal apparatus over the lead-in section and/or over the lead-out section. Such lead-in sections and/or lead-out sections can be generated for all portions of the contour. In the case of two portions that are directly connected to one another, the removal apparatus, after moving over an end of a lead-out section of a preceding portion, can jump to a start of an upstream portion of a downstream portion that follows the portion. Not only during skipping but also during jumping between two successive portions of the contour that are arranged in a manner separately from one another, the removal apparatus can correspondingly jump first to the lead-in section of a downstream portion and/or jump only after movement over the lead-out section of a portion arranged upstream of the downstream portion. By way of example, it is possible only ever to jump/skip between ends of lead-in sections and/or starts of lead-out sections. Such a lead-in section and/or lead-out section makes it possible that, irrespective of when jumping occurs or skipping occurs after completion of a portion, the removal apparatus is always guided from the same direction to the portions. Moreover, time for synchronization between scanner and laser is created during movement over the lead-in section and/or lead-out section.

In the step of generating, the lead-in section can be generated which is directly connected to the downstream portion and/or the lead-out section can be generated which is directly connected to the upstream portion. By way of example, in the step of generating, the lead-in section can be generated which is connected to the downstream portion directly as an extension thereof, and/or the lead-out section can be generated which is connected to the upstream portion directly as an extension thereof. In this regard, for example, an orientation of the lead-in section and/or lead-out section can correspond to that of the associated portion. If a portion is shaped such that it runs straight, for example, then its lead-in section and/or lead-out section can also be shaped in straight fashion. In the case of a curved portion, the lead-in section and/or lead-out section thereof can also be shaped correspondingly in curved fashion.

In accordance with one embodiment, in the step of generating, the lead-in section can be generated, the lead-in length of which is shorter than a length of the downstream portion, and/or the lead-out section can be generated, the lead-out length of which is shorter than a length of the upstream portion. The lead-in section and/or lead-out section can be very short since they serve merely for the orientation of the removal apparatus. Unnecessarily long paths can thus be avoided.

In the step of skipping, the removal apparatus can be moved on a direct path from an upstream portion of the contour that is arranged upstream of the portion to a downstream portion of the contour that follows the portion. In this regard, in the step of skipping, the removal apparatus can be moved on the shortest path from the upstream portion to the downstream portion, for example on a straight line without unnecessary detours. In this case, in the step of skipping, the removal apparatus can nevertheless be moved from the end of the lead-out section of the upstream portion to the start of the lead-in section of the downstream portion. During skipping, advantageously, it is always possible to choose the path with the least distance between an upstream portion and a portion and/or the path with the least distance between a portion and a downstream portion.

It is furthermore advantageous if in the step of skipping, a speed of movement of the removal apparatus is higher than in the step of guiding. In this regard, the removal apparatus can be moved at maximum speed in the step of skipping. The removal apparatus can also be moved at maximum speed in the course of jumping between successive portions that are unconnected in a separated manner. Since no material processing is provided during skipping and jumping, a particularly fast speed of movement can be realized here for the purpose of saving time. In the step of guiding, by contrast, in which the surface is removed, a slower speed of movement suitable for the processing can be realized for the removal apparatus.

The method can comprise a step of further skipping, in which a further portion of the contour is skipped if the further portion has the or a further target wall thickness. This serves for a further saving of time. Correspondingly, all portions that each have a target wall thickness can be skipped.

In accordance with one embodiment, the steps of the method can be repeated until all portions of the contour each have a dedicated target wall thickness. A complete weakening line can thus be produced within a short time. In this case, the removal apparatus can be guided repeatedly over the portions in order to attain the target wall thickness for the individual portions, wherein repeated guiding over the same portion can be repeated at the earliest after a defined period of time after the processing. Such a time delay between the scanning cycles/processing cycles can enable the surface to cool down in order to prevent the surface from overheating.

A device is designed to carry out or implement the steps of a variant of a method presented here in corresponding apparatuses. This embodiment variant of the approach in the form of a device also enables the objective underlying the approach to be achieved rapidly and efficiently.

In the present case, a device can be understood to mean an electrical appliance which processes sensor signals and outputs control and/or data signals depending thereon. The device can comprise an interface, which can be designed in the form of hardware and/or software. In the case of a hardware design, the interfaces can be part of a so-called system ASIC, for example, which includes a wide variety of functions of the device. However, it is also possible for the interfaces to be dedicated integrated circuits or to consist of discrete components at least in part. In the case of a software design, the interfaces can be software modules that are present alongside other software modules on a microcontroller, for example.

What is also advantageous is a computer program product comprising program code which can be stored on a machine-readable carrier such as a semiconductor memory, a hardware disk storage unit or an optical storage unit and is used for carrying out the method according to one of the above-described embodiments when the program product is executed on a computer or a device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The approach is explained in greater detail by way of example below with reference to the accompanying drawings, in which.

DETAILED DESCRIPTION

In the following description of expedient exemplary embodiments of the present approach, identical or similar reference signs are used for the elements having a similar effect that are illustrated in the various figures, a repeated description of these elements being dispensed with.

Figure 1:
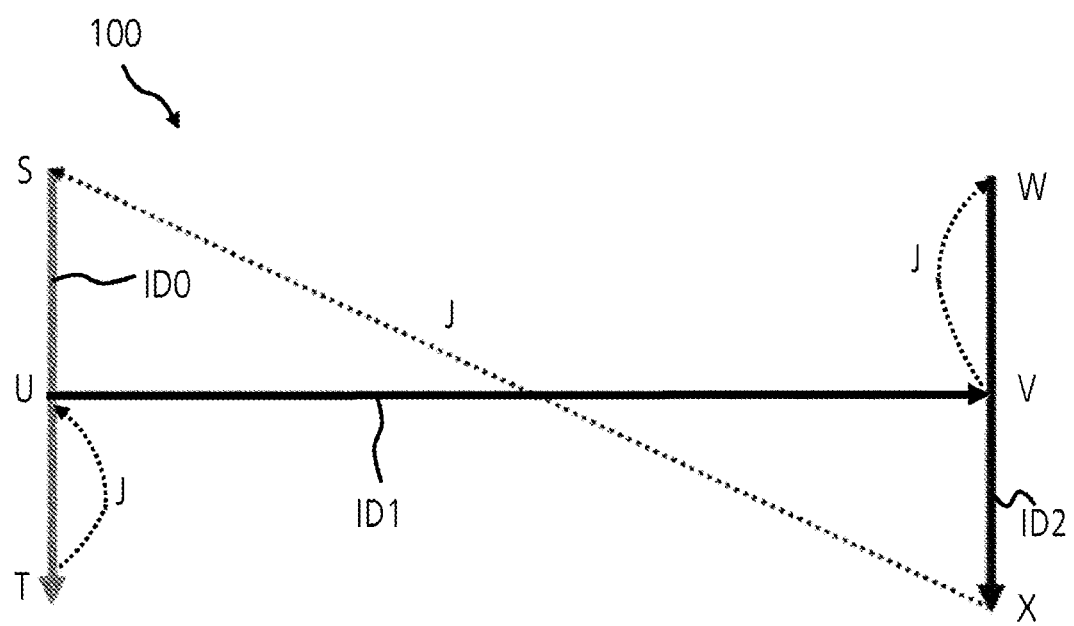
FIG. 1 shows a schematic illustration of a contour for a weakening line.

FIG. 1 shows a schematic illustration of a contour 100 for a weakening line.

FIG. 1 describes a conventional processing process for producing the weakening line using a laser beam along the contour 100. The contour 100 is subdivided into three segments ID0, ID1, ID2 here by way of example. A controlled movement of the laser beam is usually effected by way of a galvanometer scanner. The segments ID0, ID1, ID2 indicating the weakening lines to be produced are represented by continuously drawn contours/lines in FIG. 1. The dashed contours/lines J show a respective jump of the laser beam to a next removal point. During the jumps J, the laser beam is switched off here by way of example.

In the example shown here, the processing by means of the laser beam starts at point S of the segment ID0 and is guided via the point U as far as the point T of the segment ID0. At the point T, a jump J to the point U takes place. The laser beam is then guided over the segment ID1 to the point V. At the point V, a jump J to the point W of the segment ID2 takes place. The laser beam is then guided from the point W via the point V as far as the point X of the segment ID2. At the point X, a jump J to the point S of the segment ID0 takes place. At point S, the sequence just described is repeated until all segments ID0, ID1, ID2 have a target wall thickness respectively provided for them.

In the example described here, the segment ID0 attains its target wall thickness after 11 processing cycles, the segment ID1 attains its target wall thickness after 16 cycles, and the segment ID2 attains its target wall thickness after 14 cycles. In the example described here, the maximum number of cycles is 16. That means that the laser beam will go over the complete contour 100 16 times, irrespective of whether or not a segment ID0, ID1, ID2 is already assessed as "OK", i.e. having the desired target wall thickness, on account of the settings. According to the prior art, there is merely the possibility of switching off the laser at individual removal points if the previously defined value of the remaining wall thickness has already been attained at this point.

The jump J between ID0 and ID1, and between ID1 and ID2, would usually precede in a straight line along the processing line. This is shown as a curve in FIG. 1 merely for the sake of better illustration.

In the example described here, long cycle times ensue as a result of the scanning movement being continuously repeated and the laser being frequently switched on and off.

Figure 2:
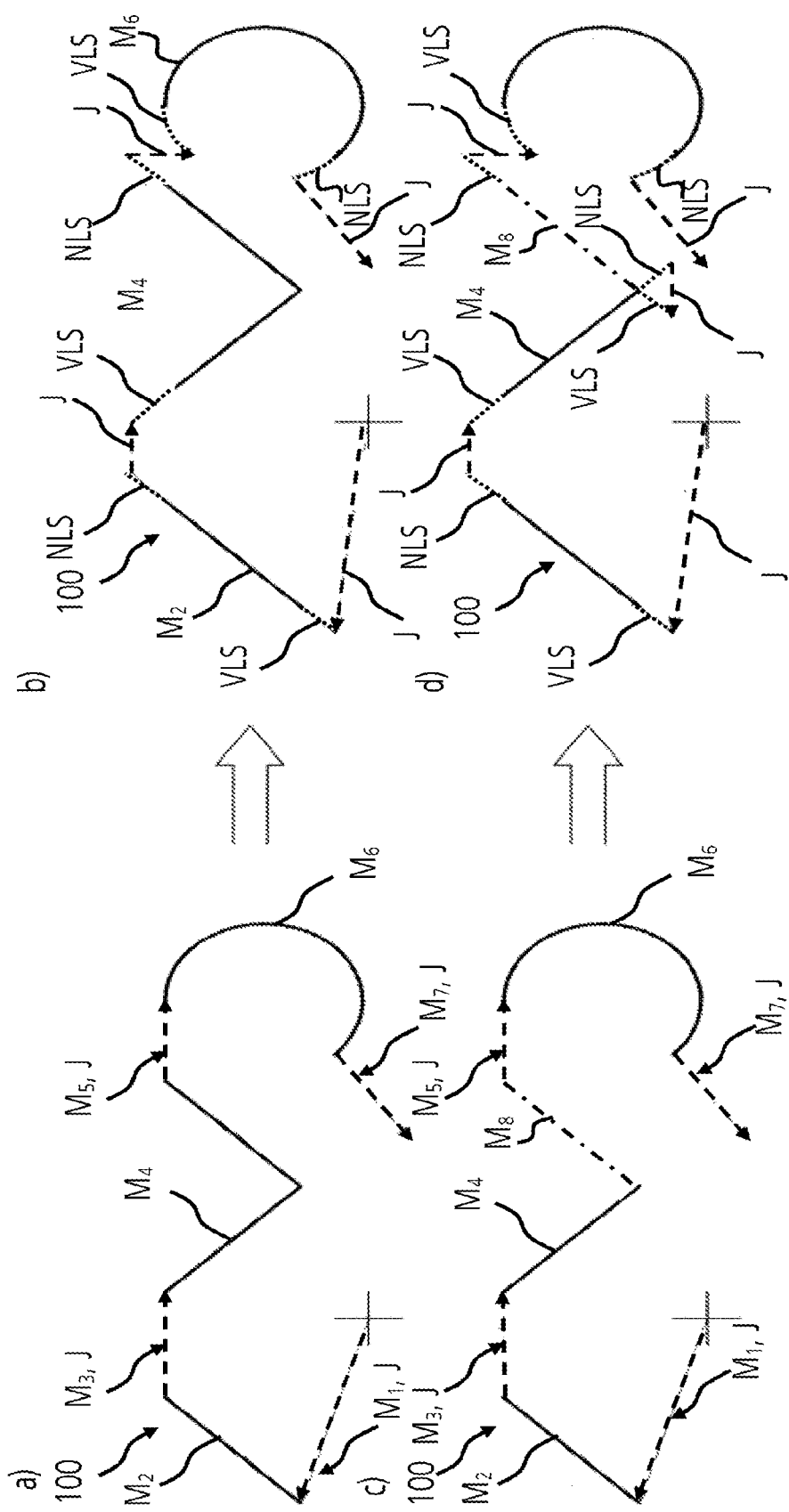
FIG. 2 shows a comparison of schematically illustrated contours 100 for processing by means of a device in accordance with one exemplary embodiment for producing a weakening line in a surface of a component.
Figure 3:
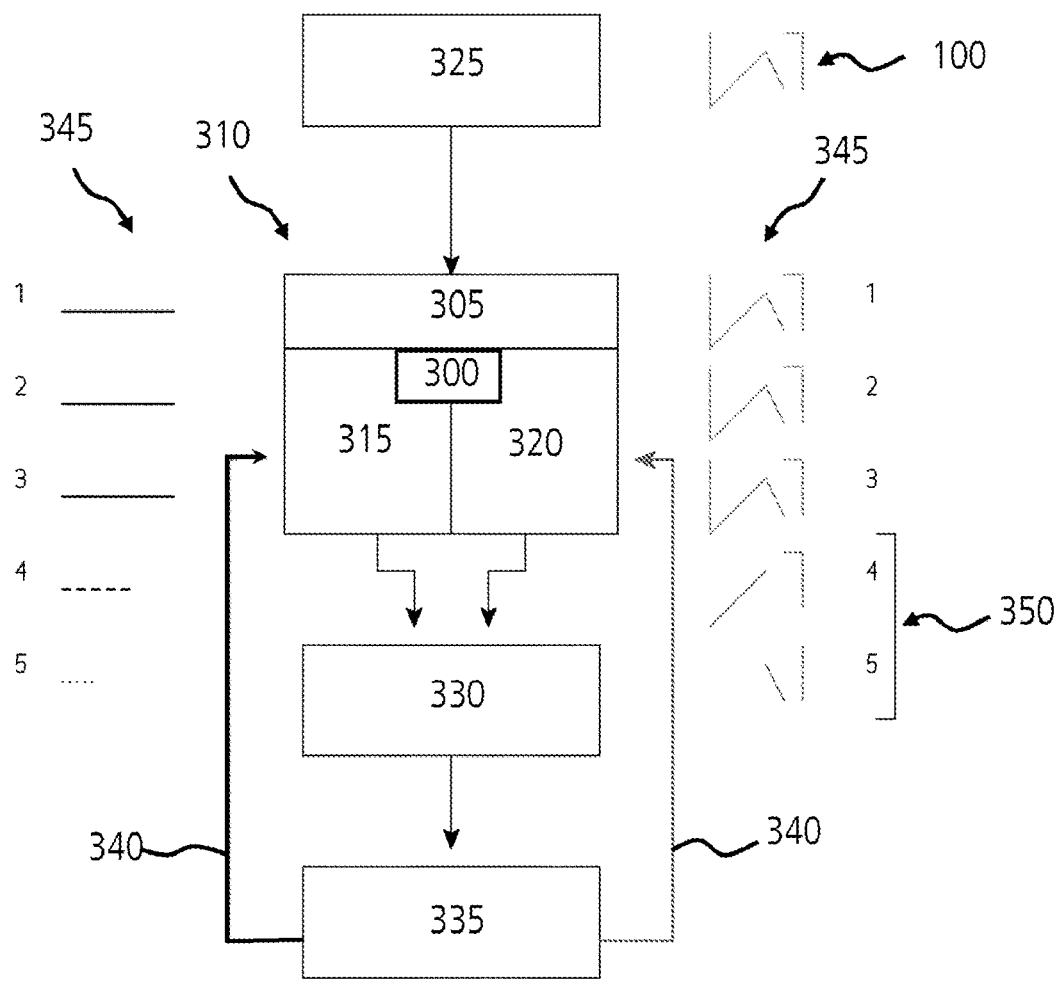
FIG. 3 shows a schematic illustration of a device in accordance with one exemplary embodiment for producing a weakening line in a surface of a component.
Figure 4:
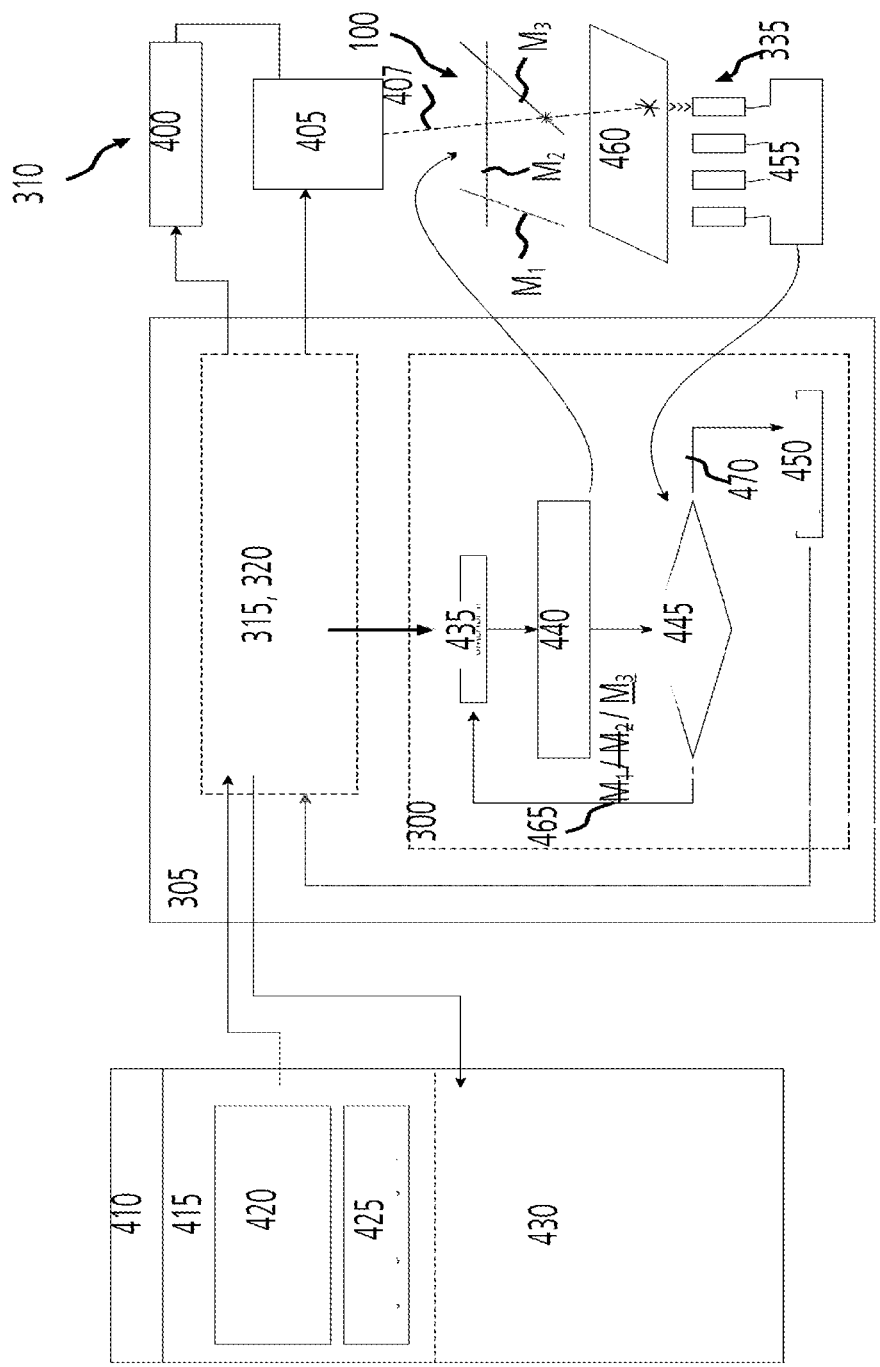
FIG. 4 shows a schematic illustration of a device in accordance with one exemplary embodiment for producing a weakening line in a surface of a component.

FIG. 2 shows a comparison of schematically illustrated contours 100 for processing by means of a device in accordance with one exemplary embodiment for producing a weakening line in a surface of a component. The device is shown in FIGS. 3 and 4.

At least one of the contours 100 is applicable in accordance with one exemplary embodiment for producing the weakening line in the surface of a covering element of an airbag cover of a vehicle airbag, and is marked there for example. The contour 100 in section a) of the figure has in accordance with this exemplary embodiment, merely by way of example, seven successive portions $M_1$, $M_2$, $M_3$, $M_4$, $M_5$, $M_6$, $M_7$ provided for the same or arbitrary different target wall thicknesses.

The device for producing the weakening line in the surface is designed to guide a removal apparatus for removing a material of the surface over the plurality of portions $M_1$, $M_2$, $M_3$, $M_4$, $M_5$, $M_6$, $M_7$ of the predefined line-shaped contour 100 using an activated laser beam in order to produce a target wall thickness for at least one of the portions $M_1$, $M_2$, $M_3$, $M_4$, $M_5$, $M_6$, $M_7$, in order to produce the weakening line. The device is furthermore designed to skip the portion $M_1$, $M_2$, $M_3$, $M_4$, $M_5$, $M_6$, $M_7$ if the portion $M_1$, $M_2$, $M_3$, $M_4$, $M_5$, $M_6$, $M_7$ has the target wall thickness.

The portions $M_1$, $M_2$, $M_3$, $M_4$, $M_5$, $M_6$, $M_7$ are shaped arbitrarily differently in accordance with this exemplary embodiment; by way of example, the second portion $M_2$ is shaped in straight fashion and/or the fourth portion $M_4$ is shaped in V-shaped fashion and/or the sixth portion $M_6$ is shaped as a curved line. In accordance with one exemplary embodiment, the portions $M_1$, $M_2$, $M_3$, $M_4$, $M_5$, $M_6$, $M_7$ are arranged in a manner merging directly into one another at least in part in order to produce a continuous weakening line, or are arranged in a manner separated from one another at least in part in order to produce a weakening line that is interrupted/perforated with arbitrary distances among the portions $M_1$, $M_2$, $M_3$, $M_4$, $M_5$, $M_6$, $M_7$. In this case, the distances are the same or different from one another. In accordance with this exemplary embodiment, each of the portions $M_1$, $M_2$, $M_3$, $M_4$, $M_5$, $M_6$, $M_7$ has a target wall thickness, and these are each the same or different from one another. In accordance with this exemplary embodiment, the portions $M_1$, $M_3$, $M_5$, $M_7$ already have their desired target wall thicknesses, for which reason the device skips these portions $M_1$, $M_3$, $M_5$, $M_7$ in order to shorten the processing process for producing the weakening line. During skipping, the portions $M_1$, $M_3$, $M_5$, $M_7$ are each omitted, that is to say that the removal apparatus is not guided over the portions $M_1$, $M_3$, $M_5$, $M_7$. During skipping, the removal apparatus, in each case with omission of the skipped portion $M_1$, $M_3$, $M_5$, $M_7$, is guided to a downstream portion that follows the skipped portion $M_1$, $M_3$, $M_5$, $M_7$. In this case, the contour 100 is actively changed, here shortened. The skipped portions $M_1$, $M_3$, $M_5$, $M_7$ are not illustrated in FIG. 2; the dashed arrows denote jumps J during the skipping of the portions $M_1$, $M_3$, $M_5$, $M_7$.

In accordance with this exemplary embodiment, the device is furthermore designed to deactivate an output of the laser beam during skipping.

In accordance with this exemplary embodiment, the device is designed to move the removal apparatus during skipping on a direct path from an upstream portion $M_1$, $M_2$, $M_3$, $M_4$, $M_5$, $M_6$, $M_7$ of the contour 100 that is arranged upstream of the portion $M_1$, $M_2$, $M_3$, $M_4$, $M_5$, $M_6$, $M_7$ to a downstream portion $M_1$, $M_2$, $M_3$, $M_4$, $M_5$, $M_6$, $M_7$ of the contour 100 that follows the portion $M_1$, $M_2$, $M_3$, $M_4$, $M_5$, $M_6$, $M_7$. In accordance with this exemplary embodiment, the device is furthermore designed, during skipping, to increase a speed of movement of the removal apparatus by comparison with a speed of movement during guiding over the portion $M_1$, $M_2$, $M_3$, $M_4$, $M_5$, $M_6$, $M_7$ during processing. In accordance with this exemplary embodiment, the device is designed to skip all portions $M_1$, $M_2$, $M_3$, $M_4$, $M_5$, $M_6$, $M_7$ of the contour 100 as soon as they each have their target wall thickness.

In accordance with this exemplary embodiment, the device is designed to repeat the guiding of the removal apparatus for the purpose of removing the material of the surface over the plurality of portions $M_1$, $M_2$, $M_3$, $M_4$, $M_5$, $M_6$, $M_7$ of the contour 100 using the activated laser beam and also the skipping of the portions $M_1$, $M_2$, $M_3$, $M_4$, $M_5$, $M_6$, $M_7$ having the attained target wall thickness until all portions $M_1$, $M_2$, $M_3$, $M_4$, $M_5$, $M_6$, $M_7$ of the contour 100 each have a dedicated target wall thickness. In accordance with one exemplary embodiment, the device in this case makes possible repeated guiding over the same portion $M_1$, $M_2$, $M_3$, $M_4$, $M_5$, $M_6$, $M_7$ at the earliest after a defined period of time after processing.

Section b) of the figure describes the generation of a lead-in section VLS and/or lead-out section NLS. Upon a jump J of the switched-off laser beam to the next processing portion $M_2$, $M_4$, $M_6$, it is necessary to synchronize the mechanical movement with the point in time of "laser switch-on". The laser beam is intended to impinge on each removal point at the same position with the same focus during each repeated scanning movement. Only that ensures that the material in each hole is removed continuously to the defined value. The skipping of completed portions requires flexible synchronization between laser operation and beam position. Time for the synchronization can be created by the lead-in section VLS and/or lead-out section NLS. In accordance with one exemplary embodiment, the device comprises for this purpose a generating apparatus designed to generate the lead-in section VLS for a downstream portion $M_1$, $M_2$, $M_3$, $M_4$, $M_5$, $M_6$, $M_7$ of the contour 100 that follows the portion $M_1$, $M_2$, $M_3$, $M_4$, $M_5$, $M_6$, $M_7$, wherein the device is designed to move the removal apparatus during skipping to the lead-in section VLS in order to move the removal apparatus over the lead-in section VLS and/or wherein the generating apparatus is designed to generate the lead-out section NLS for an upstream portion $M_1$, $M_2$, $M_3$, $M_4$, $M_5$, $M_6$, $M_7$ of the contour 100 that is arranged upstream of the portion $M_1$, $M_2$, $M_3$, $M_4$, $M_5$, $M_6$, $M_7$, wherein the device is designed to move the removal apparatus over the lead-out section NLS before skipping.

In accordance with this exemplary embodiment, the lead-in section VLS is generated in each case as a section between the portions $M_1$, $M_2$, $M_3$, $M_4$, $M_5$, $M_6$, $M_7$ and the downstream portions $M_1$, $M_2$, $M_3$, $M_4$, $M_5$, $M_6$, $M_7$ with respect thereto. In accordance with this exemplary embodiment, the device is designed to move the removal apparatus during skipping to a start of the lead-in section VLS facing the skipped portion $M_1$, $M_2$, $M_3$, $M_4$, $M_5$, $M_6$, $M_7$, in order then to move over the lead-in section VLS to an end of the lead-in section VLS facing the downstream portion $M_1$, $M_2$, $M_3$, $M_4$, $M_5$, $M_6$, $M_7$. Correspondingly, in accordance with this exemplary embodiment, the generating apparatus is designed to generate the lead-out section NLS between the upstream portion $M_1$, $M_2$, $M_3$, $M_4$, $M_5$, $M_6$, $M_7$ and the skipped portion $M_1$, $M_2$, $M_3$, $M_4$, $M_5$, $M_6$, $M_7$. In accordance with this exemplary embodiment, the device is designed to move the removal apparatus before skipping over a start of the lead-out section NLS facing the upstream portion $M_1$, $M_2$, $M_3$, $M_4$, $M_5$, $M_6$, $M_7$ as far as an end of the lead-out section NLS facing the portion $M_1$, $M_2$, $M_3$, $M_4$, $M_5$, $M_6$, $M_7$. During movement of the removal apparatus over the lead-in section VLS and/or over the lead-out section NLS, the device in accordance with this exemplary embodiment deactivates an output of the laser beam. In accordance with this exemplary embodiment, the generating apparatus is designed to generate the lead-in section VLS which is directly connected to the downstream portion $M_1$, $M_2$, $M_3$, $M_4$, $M_5$, $M_6$, $M_7$ and/or to generate the lead-out section NLS which is directly connected to the upstream portion $M_1$, $M_2$, $M_3$, $M_4$, $M_5$, $M_6$, $M_7$. By way of example, in accordance with one exemplary embodiment, the generating apparatus generates the lead-in section VLS which is connected to the downstream portion $M_1$, $M_2$, $M_3$, $M_4$, $M_5$, $M_6$, $M_7$ directly as an extension thereof and/or the lead-out section NLS which is connected to the upstream portion $M_1$, $M_2$, $M_3$, $M_4$, $M_5$, $M_6$, $M_7$ directly as an extension thereof. In this regard, the lead-in section VLS and/or lead-out section NLS for a portion running straight, here the portions $M_1$, $M_4$, are/is likewise generated as running straight in accordance with one exemplary embodiment. Correspondingly, the lead-in section VLS and/or lead-out section NLS for a curved portion, here the portion $M_6$, are/is likewise generated as correspondingly curved in accordance with one exemplary embodiment.

In accordance with one exemplary embodiment, the generating apparatus is furthermore designed to generate the lead-in section VLS, the lead-in length of which is shorter than a length of the downstream portion, and/or to generate the lead-out section NLS, the lead-out length of which is shorter than a length of the upstream portion.

Section c) of the figure corresponds visually to section a) of the figure, but section c) of the figure has an eighth portion $M_8$ in accordance with this exemplary embodiment. The portion $M_4$ shaped in V-shaped fashion in section a) of the figure is subdivided into two interconnected portions $M_4$, $M_8$, each of which is straight and which jointly produce the V-shape. In accordance with this exemplary embodiment, the eighth portion $M_8$ is arranged between the fourth portion $M_4$ and the fifth portion $M_5$.

Section d) of the figure, in line with the description in section b) of the figure, illustrates the generation of a lead-out section NLS for the now straight fourth portion $M_4$ and the generation of a lead-in section VLS for the eighth portion $M_8$. In the case of the two directly interconnected portions $M_4$, $M_8$, in accordance with this exemplary embodiment, the removal apparatus, after moving over an end of the lead-out section NLS of the preceding portion $M_4$, jumps to a start of the lead-in section VLS of the downstream portion $M_8$ that follows the portion $M_4$.

Sections b) and d) of the figure involve producing the lead-in sections VLS and lead-out sections NLS for the portions $M_2$, $M_4$, $M_6$, $M_8$ to be processed, which serve for accelerating and respectively decelerating the movement of the laser beam. By virtue of these lead-in sections VLS and lead-out sections NLS with the laser switched off, time is gained for synchronizing the laser operation and the beam position. It is thus possible to ensure that the laser impinges on the first removal point at exactly the same location, regardless of the direction from which the arriving beam "jumped".

Furthermore, in accordance with one exemplary embodiment, the time period/time window of the lead-in section VLS is used to make a preliminary evaluation of the process already in a microcontroller and to decide whether or not subsequent portions ought to be directly skipped. For this purpose, in accordance with one exemplary embodiment, the result from the preceding scanning movement is retrieved and processed, and the further movement sequence is controlled.

At the end of the process, the number of remaining portions $M_2$, $M_4$, $M_6$, $M_8$ to be processed is smaller and a time between the repetitions of the scanning movements becomes shorter. This can lead to increased unwanted action of heat on the material. In order to avoid this, in accordance with one exemplary embodiment, a time delay is realized for the next scanning movement.

The device presented here advantageously makes possible a method for introducing a weakening line into a covering element by material removal by means of a laser. For the reliable deployment of an airbag, it is important for covering elements in the region of the airbag flaps to be provided with target breaking locations; the latter are realized by the introduction of weakening lines. For visual reasons, said weakening lines are generally introduced from a non-visible rear side of the covering element. Besides an accurately settable remaining tear strength of the weakening line, the highest quality demands in respect of the surfaces are satisfied only if the weakening line is visually and haptically imperceptible on the viewing side of the covering element facing the passenger.

Covering elements are understood here in the broadest sense to mean interior elements in vehicles, in particular instrument panels. These covering elements are of single-layer or multilayer design in accordance with various exemplary embodiments. As materials, in accordance with one exemplary embodiment, the covering element comprises plastics such as polypropylene (PP), thermoplastic polyolefin (TPO), polyurethane (PU) and/or polyvinyl chloride. For the viewing side of the covering element facing the passenger, high-quality decorative layers, e.g. composed of textile material or leather, are processed in accordance with one exemplary embodiment.

FIG. 3 shows a schematic illustration of a device 300 in accordance with one exemplary embodiment for producing a weakening line in a surface of a component. This can involve the device 300 described in FIG. 2.

In accordance with this exemplary embodiment, the device 300 is implemented in a controller 305 of the removal apparatus 310. In accordance with this exemplary embodiment, the controller 305 furthermore comprises a laser control 315 and a scanner control 320, wherein the device 300 in accordance with this exemplary embodiment is connected to the scanner control 320 and the laser control 315 in a manner capable of signal transmission.

In accordance with this exemplary embodiment, the contour 100, which may also be referred to as "figure", is designed on a PC 325 and received by the controller 305. A workpiece 330, here in the form of the surface of the covering element, is processed depending on the laser control 315 and scanner control 320. A sensor system 335 senses values such as the wall thicknesses of the covering element at the individual portions of the contour 100. The laser control 315 is regulated depending on the sensor values 340 of the sensor system 335. Courtesy of the device 300 presented here, the scanner control 320 is also regulated depending on the sensor values 340 of the sensor system 335.

In one application example, using the removal apparatus 310, a pulsed laser beam is directed onto the rear side of the covering element and guided in the shape of a line. In this case, the parameters of the laser pulse are chosen such that the latter brings about an energy input which, at the respective impingement location, leads to heating of the material to a temperature above an ablation threshold, but the temperature in regions of the material that adjoin the respective impingement location is kept below a limit temperature. This scanning movement along the weakening line to be produced is repeated multiple times until a defined residual wall thickness is attained on the viewing side. The residual wall thickness attained is monitored by means of the sensor system 335, which has a spatial resolution corresponding to the size of the impingement locations. Upon the defined residual wall thickness/target wall thickness being attained at an individual impingement location, the device 300 is used to skip this portion with the laser beam being switched off. The scanning movements are repeated (N cycles) until all impingement points have attained a defined residual wall thickness. In this case, in accordance with this exemplary embodiment, the weakening line is formed by a continuous groove or a juxtaposition of grooves or holes for example in the form of blind holes or microperforation holes, or combinations thereof. In accordance with one exemplary embodiment, a removal depth is constant or varies over the length of the weakening line in a manner following a specific regime.

In accordance with this exemplary embodiment, five repeated processing cycles 345 of the contour 100 are carried out for producing the weakening line. In the first three processing cycles 345, the laser control/scanner control is implemented in a manner completely matching the contour 100. In the fourth and fifth processing cycles 345, the laser control/scanner control is implemented in a manner matching the contour 100 to a decreasing extent; consequently, in the fourth and fifth processing cycles 345, an active change 350 of the contour 100 is effected in each case since, in accordance with one exemplary embodiment, portions that have already been completed are skipped.

In the approach presented here, the figure/contour 100 consists of individual partial figures in the form of portions which are skipped by the laser beam after weakening has occurred. Each portion is characterized by a defined residual wall thickness that is attained by means of a specific weakening regime. In accordance with one exemplary embodiment, these weakening regimes are defined and supported by parameters. Possible parameters of this type are, in accordance with one exemplary embodiment:

type of laser radiation
laser power
pulse width
focusing
geometry of the weakening line
size and spacings of grooves and holes
number of cycles of the scanning movement
speed of the scanning movement Courtesy of the device 300, individual portions of the figure are skipped after they have been completed, i.e. when all scanning points/holes have attained the defined residual wall thickness and have been assessed as "OK". In the subsequent repeated scanning movement, the switched-off laser beam skips these portions at maximum speed in accordance with one exemplary embodiment. The cycle time for the production of the entire weakening line is reduced as a result.

FIG. 4 shows a schematic illustration of a device 300 in accordance with one exemplary embodiment for producing a weakening line in a surface of a component. This can involve the device 300 described in FIG. 2 or 3. As described in FIG. 3, the device 300 in accordance with this exemplary embodiment is implemented in the controller 305, here in the form of a technological processor. The laser control 315 and scanner control 320 may also be referred to as a "communication processor", which is designed for communication with the device 300, the laser 400 for generating the laser beam 407, the scanner 405 and a user interface/operator control software 410. In accordance with this exemplary embodiment, the user interface/operator control software 410 comprises a prescription/predefinitions 415 with the target wall thicknesses in the form of target values 420 for a required weakening for each portion $M_1$, $M_2$, $M_3$ of the contour 100, which comprises three portions $M_1$, $M_2$, $M_3$ in accordance with this exemplary embodiment. In accordance with this exemplary embodiment, the target value 420 for the required weakening of the first portion $M_1$ is 95%, the target value 420 for the required weakening of the second portion $M_2$ is 90%, and the target value 420 for the required weakening of the third portion $M_3$ is 98%. Furthermore, in accordance with this exemplary embodiment, the prescription/predefinitions 415 comprises further predefinitions 425 such as hole type, dimensions, energy input, speeds for each of the portions $M_1$, $M_2$, $M_3$. In accordance with this exemplary embodiment, the user interface/operator control software 410 furthermore comprises an evaluation apparatus/control system 430 designed to compare the target values 420 with actual values and/or to evaluate all further evaluation parameters. On account of the predefinitions 415 being successfully satisfied, individual portions $M_1$, $M_2$, $M_3$ are skipped with a jump speed which is faster than a marking speed during the processing of a portion $M_1$, $M_2$, $M_3$ that is not yet finished. In accordance with this exemplary embodiment, the portions $M_1$, $M_2$ satisfy their predefinitions 415 and the third portion $M_3$ does not satisfy its predefinitions. Therefore, in accordance with this exemplary embodiment, the finished portions $M_1$, $M_2$ are skipped and the third portion $M_3$ is processed.

In accordance with this exemplary embodiment, the device 300 comprises a circulation activation apparatus 435, a calculation apparatus 440, a checking apparatus 445 and/or a transmitting apparatus 450. In accordance with one exemplary embodiment, the circulation activation apparatus 435 activates a circulation n of the removal apparatus 310 along the contour 100. The calculation apparatus 440 calculates contour production/figure production of the contour 100 for the current circulation. In accordance with this exemplary embodiment, the checking apparatus 445 checks the predefinitions 415 with actual values from sensor evaluation electronics 455 of the sensor system 335. For this purpose, the sensor evaluation electronics 455 provide sensed sensor values from a sensor array 460. If as yet not all portions $M_1$, $M_2$, $M_3$ satisfy their predefinitions, i.e. they do not yet have their target wall thicknesses, the checking apparatus 445 outputs an activation signal 465 to the circulation activation apparatus 435 for activating a further circulation, wherein finished portions $M_1$, $M_2$ are skipped during the further circulation. If all portions $M_1$, $M_2$, $M_3$ satisfy their predefinitions, i.e. have their target wall thicknesses, the checking apparatus 445 outputs a transmission signal 470 to the transmitting apparatus 450 for transmitting a result to the user interface/operator control software 410.

In accordance with one exemplary embodiment, the user interface/operator control software 410 is part of the device 300.

Figure 5:
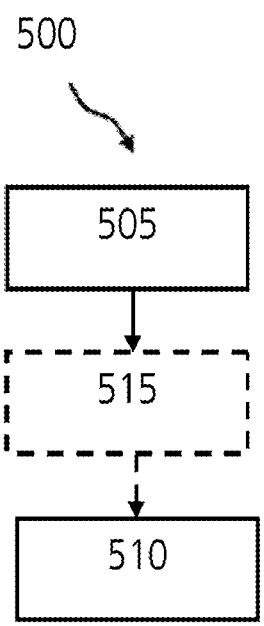
FIG. 5 shows a flow diagram of a method in accordance with one exemplary embodiment for producing a weakening line in a surface of a component.

FIG. 5 shows a flow diagram of a method 500 in accordance with one exemplary embodiment for producing a weakening line in a surface of a component. This can involve a method 500 which is controllable and/or implementable by the device described in either of FIGS. 2 and 3.

The method 500 comprises a step 505 of guiding and a step 510 of skipping. In the step 505 of guiding, a removal apparatus for removing a material of the surface is guided over a plurality of portions of a predefined line-shaped contour using an activated laser beam in order to produce a target wall thickness for at least one of the portions, in order to produce the weakening line. In the step 510 of skipping, the portion is skipped if the portion has the target wall thickness.

Optionally, the method 500 in accordance with this exemplary embodiment furthermore comprises a step 515 of generating, in which a lead-in section is generated for a downstream portion of the contour that follows the portion, wherein in the step 510 of skipping, the removal apparatus jumps to the lead-in section in order to move over the lead-in section, and/or in which a lead-out section is generated for an upstream portion of the contour that is arranged upstream of the portion, wherein the removal apparatus is moved over the lead-out section before the step 510 of skipping.

The exemplary embodiments described and shown in the figures have been chosen only by way of example. Different exemplary embodiments can be combined with one another in their entirety or with regard to individual features. Moreover, an exemplary embodiment can be supplemented by features of a further exemplary embodiment.

Furthermore, method steps of the approach can be performed repeatedly and also in a different order than that described.

If an exemplary embodiment comprises an "and/or" linkage between a first feature and a second feature, then this should be interpreted such that the exemplary embodiment has both the first feature and the second feature in accordance with one embodiment, and has either only the first feature or only the second feature in accordance with a further embodiment.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing a weakening line in a surface of a component, the method comprising:
   guiding a removal apparatus for removing a material of the surface over a plurality of portions of a predefined line-shaped contour using an activated laser beam in order to produce a target wall thickness for at least one of the portions in order to produce the weakening line;
   skipping the portion if the portion has the target wall thickness; and
   generating a lead-in section for a downstream portion of the contour that follows the portion,
   wherein, during said skipping, the removal apparatus jumps to the lead-in section in order to move over the lead-in section, and
   wherein an output of the activated laser beam is deactivated while the removal apparatus moves over the lead-in section.

2. The method as claimed in claim 1, wherein during said skipping, an output of the laser beam is deactivated.

3. The method as claimed in claim 1, wherein the lead-in section is directly connected to the downstream portion.

4. The method as claimed in claim 1, wherein a lead-in length of the lead-in section is shorter than a length of the downstream portion.

5. The method as claimed in claim 1, wherein during said skipping, the removal apparatus is moved on a direct path from an upstream portion of the contour that is arranged upstream of the portion to the downstream portion of the contour that follows the portion.

6. The method as claimed in claim 1, wherein during said skipping, a speed of movement of the removal apparatus is higher than said guiding.

7. The method as claimed in claim 1, further comprising skipping a further portion of the contour if the further portion has the target wall thickness.

8. The method as claimed in claim 1, wherein the steps of the method are repeated until all portions of the contour each have a dedicated target wall thickness.

9. The method as claimed in claim 1, further comprising generating a lead-out section for an upstream portion of the contour that is arranged upstream of the portion.

10. The method as claimed in claim 9, wherein the lead-out section is directly connected to the upstream portion.

11. The method as claimed in claim 9, wherein a lead-out length of the lead-out section is shorter than a length of the upstream portion.

12. The method as claimed in claim 9, wherein the removal apparatus is moved over the lead-out section before said skipping.

13. The method as claimed in claim 9, wherein the lead-out section is a section between the portion and the upstream portion.

14. The method as claimed in claim 9, wherein the lead-in section and the lead-out section are formed on each of the plurality of portions.

15. The method as claimed in claim 1, wherein the portions are shaped arbitrarily different.

16. The method as claimed in claim 1, wherein some of the plurality of portions are straight lines and some of the plurality of portions are curved lines.

17. The method as claimed in claim 1, wherein said lead-in section is a section between the portion and the downstream portion.

18. A method for producing a weakening line in a surface of a component, the method comprising:
- guiding a removal apparatus for removing a material of the surface over a plurality of portions using an activated laser beam in order to produce a target wall thickness for a portion in order to produce the weakening line;
- skipping the portion if the portion has the target wall thickness; and
- generating a lead-in section for a downstream portion that follows the portion or generating a lead-out section for an upstream portion arranged upstream of the portion,
- wherein an output of the activated laser beam is deactivated while the removal apparatus moves over the lead-in section or the lead-out section.

* * * * *